(12) United States Patent
Yamazaki

(10) Patent No.: US 11,134,160 B2
(45) Date of Patent: Sep. 28, 2021

(54) IMAGE SCANNING DEVICE

(71) Applicant: Konica Minolta, Inc., Tokyo (JP)

(72) Inventor: Kohei Yamazaki, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/852,776

(22) Filed: Apr. 20, 2020

(65) Prior Publication Data

US 2020/0344365 A1 Oct. 29, 2020

(30) Foreign Application Priority Data

Apr. 25, 2019 (JP) .................. 2019-084211

(51) Int. Cl.
*H04N 1/00* (2006.01)
*G06K 9/46* (2006.01)

(52) U.S. Cl.
CPC .......... *H04N 1/00212* (2013.01); *G06K 9/46* (2013.01); *H04N 1/0044* (2013.01); *H04N 1/00244* (2013.01); *G06K 2209/01* (2013.01); *H04N 2201/0039* (2013.01); *H04N 2201/0094* (2013.01)

(58) Field of Classification Search
CPC .......... H04N 1/00212; H04N 1/00244; H04N 1/0044; H04N 2201/0039; H04N 2201/0094; G06K 2209/01; G06K 9/00456; G06K 9/46; A61L 2202/11; A61L 2202/15; A61L 2/10; A61L 2/202; B67D 1/0084; B67D 1/0086; B67D 1/07; B67D 2001/075; B67D 2210/00015

USPC .................................. 358/1.15, 402
See application file for complete search history.

(56) References Cited

U.S. PATENT DOCUMENTS

| 8,782,148 | B2 * | 7/2014 | Gnech ..................... H04L 51/16 709/206 |
| 2007/0002392 | A1 * | 1/2007 | Ogura ................ H04N 1/00474 358/448 |
| 2008/0177743 | A1 * | 7/2008 | Kasatani ............ H04N 1/32128 |
| 2008/0294737 | A1 * | 11/2008 | Kim ................... H04N 1/00209 709/206 |
| 2008/0309957 | A1 * | 12/2008 | Horiuchi .............. G06K 9/3208 358/1.9 |
| 2009/0040544 | A1 * | 2/2009 | Matsuhara ......... H04N 1/32122 358/1.13 |
| 2009/0164596 | A1 * | 6/2009 | Sakiyama .......... H04N 1/00222 709/206 |

(Continued)

FOREIGN PATENT DOCUMENTS

| JP | 2005311485 | 11/2005 |
| JP | 2006246182 | 9/2006 |
| JP | 2017135580 | 8/2017 |

*Primary Examiner* — Negussie Worku
(74) *Attorney, Agent, or Firm* — BakerHostetler

(57) ABSTRACT

An image scanning device includes: a storage that stores therein an image feature of image data attached to a sent email; an image scanner that scans a document to obtain scanned data; and a hardware processor. The hardware processor extracts an image feature from the scanned data, and judges whether the image feature extracted from the scanned data is similar to the image feature of the image data attached to the sent email. When judging affirmatively, the hardware processor generates a new email by using part of the sent email, and sends the new email with an attachment of the scanned data.

11 Claims, 14 Drawing Sheets

(56) References Cited

U.S. PATENT DOCUMENTS

| | | | | |
|---|---|---|---|---|
| 2009/0287818 A1* | 11/2009 | Tachibana | ........... | H04L 43/0817 |
| | | | | 709/224 |
| 2009/0307322 A1* | 12/2009 | Iwasawa | ............ | H04N 1/00209 |
| | | | | 709/206 |
| 2010/0231949 A1* | 9/2010 | Mori | .................. | G06Q 30/0283 |
| | | | | 358/1.14 |
| 2011/0314384 A1* | 12/2011 | Lindgren | ................ | H04L 51/38 |
| | | | | 715/739 |
| 2013/0335766 A1* | 12/2013 | Ishiguro | ............ | H04N 1/00411 |
| | | | | 358/1.13 |
| 2014/0022592 A1* | 1/2014 | Ueda | .................... | G06F 3/1239 |
| | | | | 358/1.15 |
| 2017/0126467 A1* | 5/2017 | Yamaguchi | ............. | H04L 51/08 |

* cited by examiner

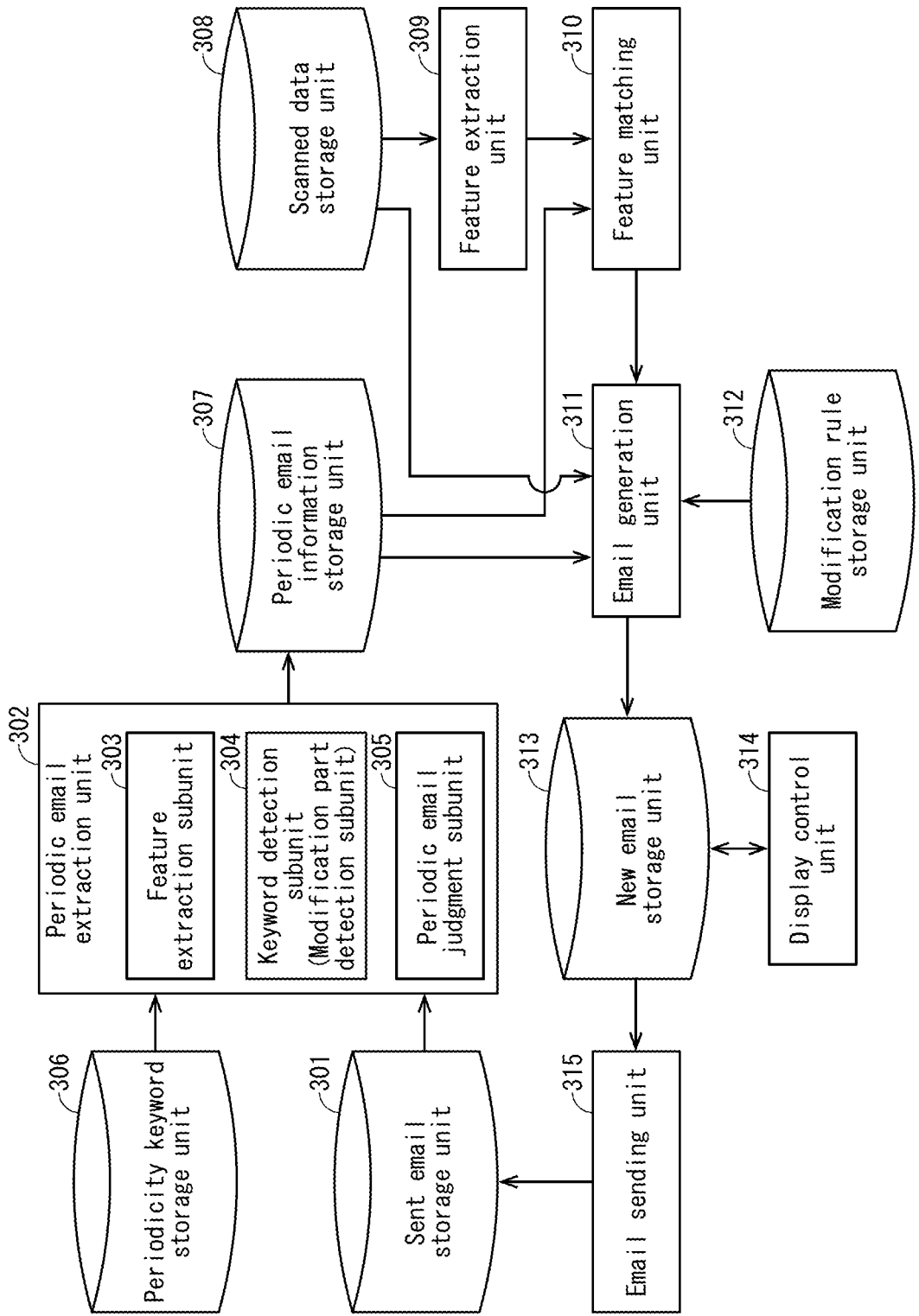

FIG. 5

| | | |
|---|---|---|
| Keyword 1 | January\|February\|March\|April\|May\|June\|July\|August\|September\|October\|November\|December | 501 |
| Keyword 2 | [0-9]{4} | |
| Keyword 3 | the [0-9]+(st\|nd\|rd\|th) | |
| Keyword 4 | the (first\|second) half of the year | |
| ⋮ | ⋮ | |

FIG. 6A — 601

| Subject | Overhead statements for February |
| --- | --- |
| Address | aaa@sample |
| Body | I am sending the overhead statements for February as an attached file. |
| Image feature | Overhead statements |
| Modification part 1 | The 25th to the 32nd characters from front in character string of subject |
| Modification part 2 | The 42nd to the 49th characters from the front in character string of body |

FIG. 6B — 602

| Subject | Overhead statements for March |
| --- | --- |
| Address | aaa@sample |
| Body | I am sending the overhead statements for March as an attached file. |
| Image feature | Overhead statements |
| Modification part 1 | The 25th to the 29nd characters from front in character string of subject |
| Modification part 2 | The 42nd to the 46th characters from the front in character string of body |

FIG. 7

Overhead statements

| Applicant | Taro Tokkyo | | Application date | April 26 |

| Date | Product | Payee | Price | Remarks |
|---|---|---|---|---|
| April 1 | ○○○○○ | ○○○ | ○○○ | ○○○○ |
| April 9 | ○○○○○ | ○○○ | ○○○ | ○○○○ |
| April 15 | ○○○○○ | ○○○ | ○○○ | ○○○○ |
| April 24 | ○○○○○ | ○○○ | ○○○ | ○○○○ |
| | | | | |
| | | | | |
| | | | | |
| | | | | |
| | | | | |
| | | | | |
| | | | | |
| | | | | |
| | | | | |
| | | | | |
| | | | | |
| | | | Total | ○○○ |

| Comment |
|---|
| ○○○○○○○○○○○○○○○○○○○○○○○ |
| ○○○○○○○○○○○○○○○○○○○○○○○ |

| Approved by |
|---|
| Ichiro Hatsumei |

FIG. 8

|  | Character string before modification | Condition | Character string after modification |
|---|---|---|---|
| Rule 1 | January\|February\|March\|April\|May\|June\|July\|August\|September\|October\|November\|December | Current date is from January 6 to February 5 | January |
| Rule 2 | January\|February\|March\|April\|May\|June\|July\|August\|September\|October\|November\|December | Current date is from February 6 to March 5 | February |
| Rule 3 | January\|February\|March\|April\|May\|June\|July\|August\|September\|October\|November\|December | Current date is from March 6 to April 5 | March |
| Rule 4 | January\|February\|March\|April\|May\|June\|July\|August\|September\|October\|November\|December | Current date is from April 6 to May 5 | April |
| ⋮ | ⋮ | ⋮ | ⋮ |

| | | |
|---|---|---|
| Subject | Overhead statements for April | |
| Address | aaa@sample | |
| Body | I am sending the overhead statements for April as an attached file. | 901 |

FIG. 10

```
1001
┌─────────────────────────────────────────────────┐
│  Please confirm to send email of the following  │
│  contents with attachment of scanned data.      │
│                                                 │
│  ┌──────────┬──────────────────────────────┐   │
│  │ Subject  │ Overhead statements for April│   │
│  ├──────────┼──────────────────────────────┤   │
│  │ Address  │ aaa@sample                   │   │
│  ├──────────┼──────────────────────────────┤   │
│  │ Body     │ I am sending the overhead    │   │
│  │          │ statements for April as an   │   │
│  │          │ attached file.               │   │
│  └──────────┴──────────────────────────────┘   │
│                                                 │
│   [ Yes ]        [ No ]     [Modify and send]  │
└─────────────────────────────────────────────────┘
```

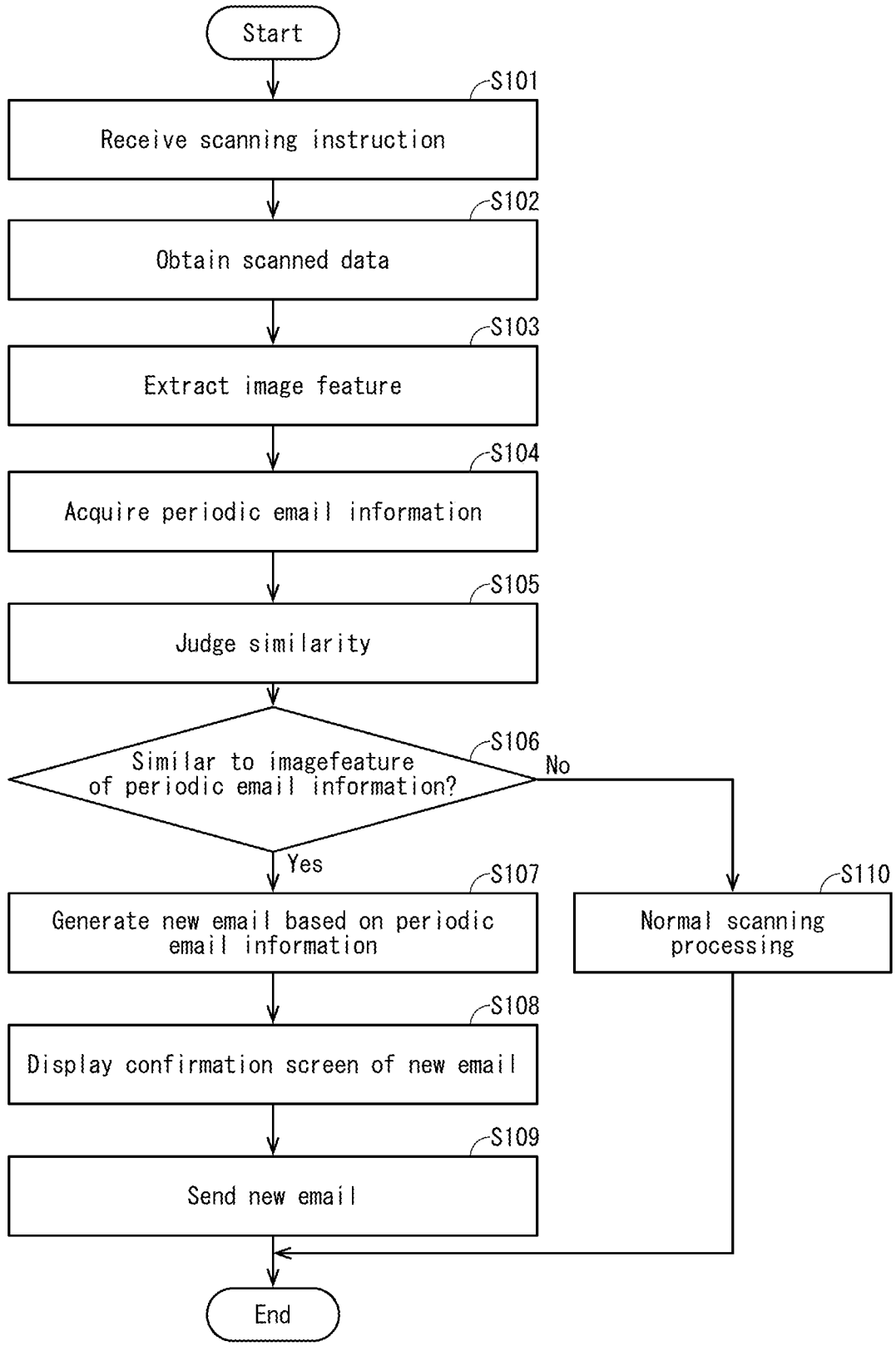

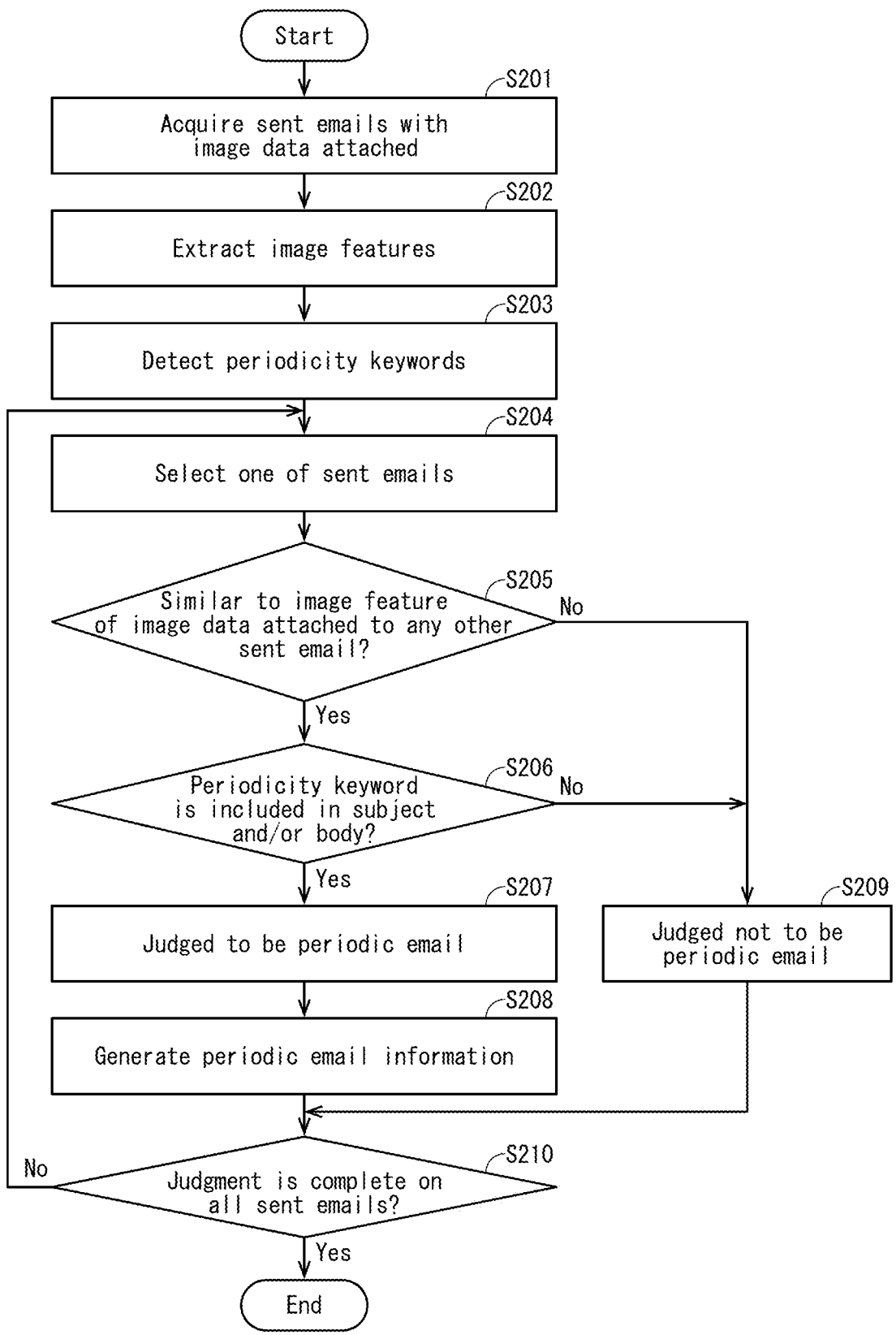

IMAGE SCANNING DEVICE

This application claims priority to Japanese Patent Application No. 2019-084211 filed Apr. 25, 2019, the contents of which are hereby incorporated herein by reference in their entirety.

BACKGROUND

Technological Field

The present disclosure relates to an image scanning device having a function of sending an email with an attachment of scanned data obtained by scanning a document.

Description of the Related Art

Conventional image scanning devices have a function of sending an email with an attachment of scanned data obtained by scanning a document. Some of such image scanning devices, which have this email sending function, has a function of assisting setup of a destination email address. For example, according to an image output device disclosed in Japanese Patent Application Publication No. 2017-135580, character recognition is performed on scanned data to detect a predefined output destination keyword from a result of the character recognition, such that an output destination corresponding to the detected output destination keyword is automatically set as a destination email address.

Although the above conventional image scanning devices automatically set a destination email address, a subject, a body, and the like are necessary to be set by users themselves. Image scanning devices are different in usability from information terminals users are always accustomed to use such as smartphones and personal computers. Accordingly, text edition by using such image scanning devices takes much time and effort, which might be a burden on the users.

SUMMARY

The present disclosure was made in view of the above problem, and aims to provide an image scanning device capable of reducing users' burden in email sending with an attachment of scanned data.

The image scanning device relating to at least one aspect of the present disclosure is an image scanning device comprising: a storage that stores therein an image feature of image data attached to a sent email; an image scanner that scans a document to obtain scanned data; and a hardware processor that: extracts an image feature from the scanned data; judges whether the image feature extracted from the scanned data is similar to the image feature of the image data attached to the sent email; and when judging affirmatively, generates a new email by using part of the sent email, and sends the new email with an attachment of the scanned data.

BRIEF DESCRIPTION OF THE DRAWING

The advantages and features provided by one or more embodiments of the disclosure will become more fully understood from the detailed description given hereinbelow and the appended drawings which are given by way of illustration only, and thus are not intended as a definition of the limits of the invention. In the drawings:

FIG. 3 is a block diagram showing configuration of a main controller 200 included in the image scanning device 100;

FIG. 5 shows examples of periodicity keywords;

FIG. 6A and FIG. 6B show examples of periodic email information;

FIG. 7 shows an example of scanned data;

FIG. 8 shows examples of modification rule information;

FIG. 9 shows an example of subject, destination address, and body of a new email;

FIG. 10 shows an example of a confirmation screen for email sending;

FIG. 11 is a flowchart of operations of the main controller 200;

FIG. 12 is a flowchart of operations of a periodic email extraction unit 302;

DETAILED DESCRIPTION OF EMBODIMENTS

Hereinafter, one or more embodiments of the present disclosure will be described with reference to the drawings. However, the scope of the invention is not limited to the disclosed embodiments.

1. Embodiment

The following describes an embodiment of an image scanning device 100 relating to the present disclosure, with reference to the drawings.

1.1 Configuration of Image Scanning Device 100

As shown in 1, the image scanning device 100 includes an image scanner 120 and an operation panel 110 at upper portions of a housing thereof. The image scanner 120 scans a document to obtain image data. The operation panel 110 displays an operation screen to receive input operations from users. Note that the image scanning device 100 may include, at lower portions of the housing thereof, an image forming unit that forms images by an electronic photography system, a sheet feeding unit that houses and feeds sheets, and the like.

The image scanner 120 conveys documents placed on a document tray to a platen glass piece by piece with use of an automatic document feeder (ADF) included therein, and scans the conveyed documents to obtain image data (scanned data) of multileveled digital signals of red (R), green (G), and blue (B) colors. The image scanner 120 stores the scanned data thus obtained in a hard disk drive (HDD) 204 which is described later.

The operation panel 110 includes a display unit configured from a liquid crystal display (LCD) or the like. The display unit displays various messages such as a confirmation screen for emailing scanned data. The operation panel 110 also includes an input unit configured from a start button for starting document scanning, a touch sensor provided on the surface of the display unit, and the like. The input unit receives scanning instructions, email sending instructions, and the like from users.

1.2 Configuration of Main Controller 200

Figure 1:
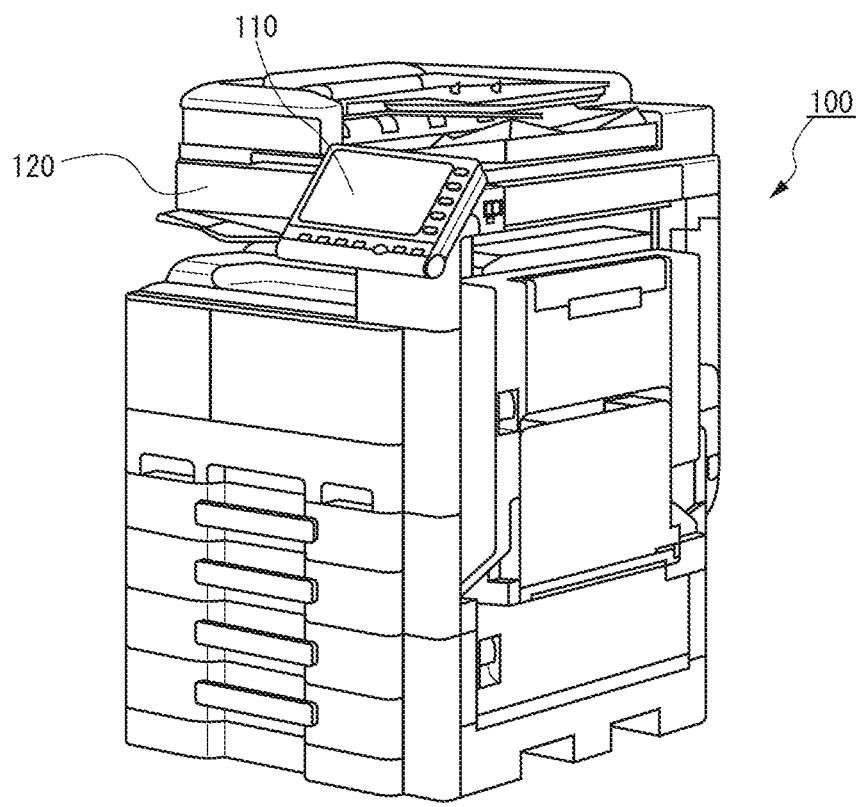
FIG. 1 is a perspective view of an image scanning device 100 relating to an embodiment of the present disclosure.
Figure 2:
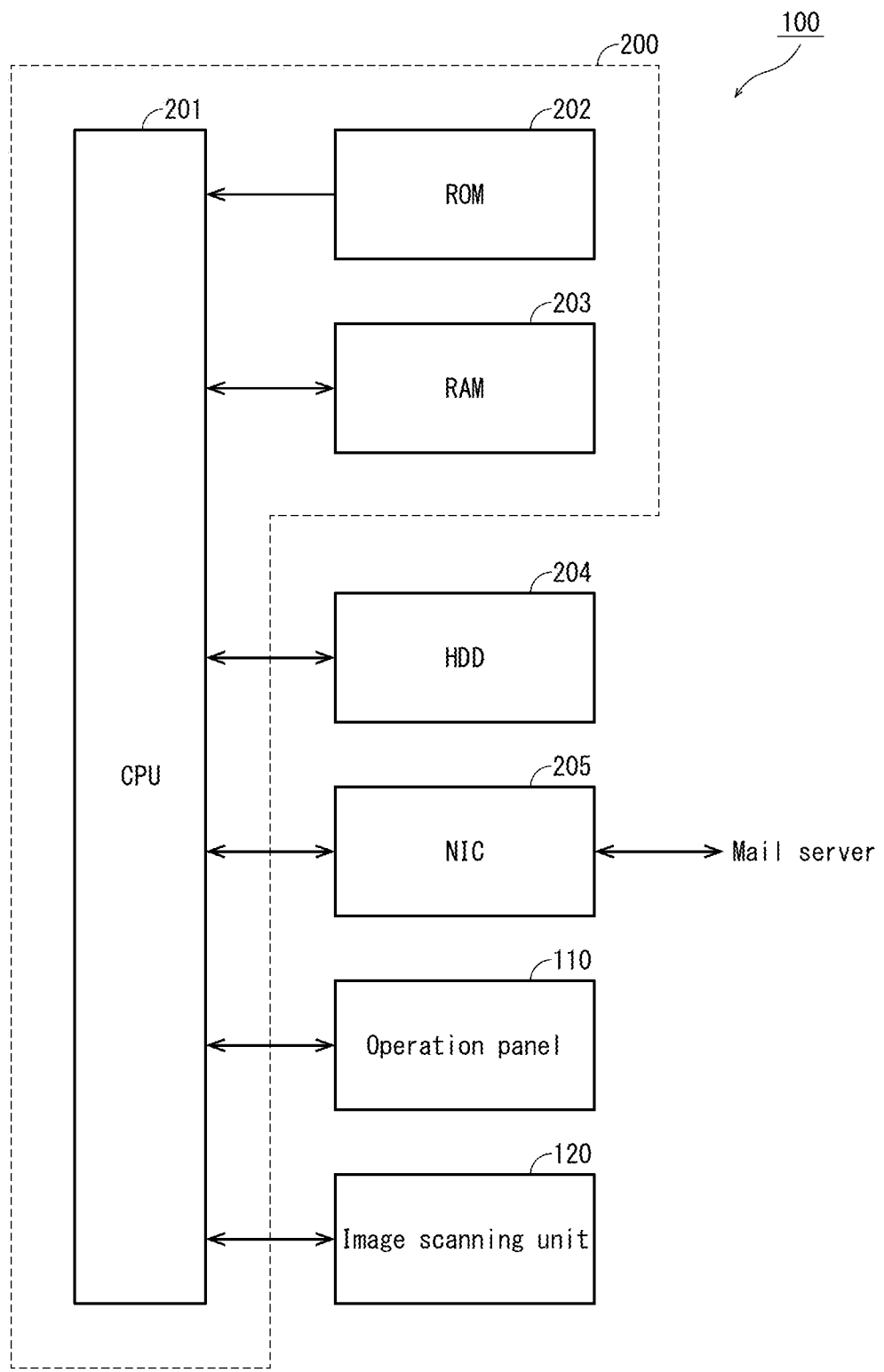
FIG. 2 is a block diagram showing configuration of the image scanning device 100.

As shown in FIG. 2, the image scanning device 100 includes a main controller 200, the HDD 204, a network interface card (NIC) 205, the operation panel 110, and the image scanner 120.

The main controller 200 includes a central processing unit (CPU) 201, a read only memory (ROM) 202, a random access memory (RAM) 203, and so on.

The CPU 201 includes a fetch subunit, a decoding subunit, an execution unit, a register file, an instruction counter, and so on. The fetch subunit fetches instruction codes one by one from a control program stored in the ROM 202. The decoding subunit decodes the fetched instruction codes. The execution subunit operates in accordance with decoding results. The CPU 201 thus operates in accordance with the control program stored in the ROM 202.

The ROM 202 is configured from a semiconductor memory, and stores in advance therein for example the control program for executing various jobs such as scanning jobs, copy jobs, and print jobs.

The RAM 203 is configured from a semiconductor memory, and stores temporarily therein for example various control variables and provides a work area for program execution by the CPU 201.

As described above, the main controller 200 includes the CPU 201, the ROM 202, the RAM, 203, and so on, and operates in accordance with the control program thereby to control the HDD 204, the NIC 205, the operation panel 110, and the image scanner 120, and so on.

For example, the main controller 200 operates in accordance with the control program thereby to receive a scanning job from a user via the operation panel 110 and control the image scanner 120 to execute an image scanning operation based on the scanning job. Also, the main controller 200 operates in accordance with the control program thereby to generate an email with scanned data attached and send the email via the NIC 205.

The HDD 204 is an HDD that stores therein scanned data obtained by the image scanner 120, emails sent in the past, periodicity keyword information, periodic email information, modification rule information, new emails in draft, screens to be displayed on the display unit of the operation panel 110, and so on. The periodicity keyword information, the periodic email information, and the modification rule information are described late.

The NIC 205 is a network interface for connection to a network such as the Internet. The image scanning device 100 connects to a sending email server through the Internet to send emails generated therein.

The operation panel 110 receives a menu screen, images, messages, and so on from the main controller 200 for display on the display unit. The operation panel 110 also receives inputs of settings of users' scanning jobs, inputs of starts of the set scan jobs, and so on for output to the main controller 200.

The image scanner 120 scans a document placed on the document tray based on control signals of the main controller 200. The image scanner 120 stores image data obtained by the scanning, namely scanned data, in the HDD 204.

1.3 Functional Configuration of Main Controller 200

The following describes the functional configuration of the main controller 200 with reference to FIG. 3. The main controller 200 includes functional units, namely, a periodic email extraction unit 302, a feature extraction unit 309, a feature matching unit 310, an email generation unit 311, a display control unit 314, and an email sending unit 315. These functional units are achieved by the CPU 201 executing the control program. Also, the HDD 204 includes storage units, namely, a sent email storage unit 301, a periodicity keyword storage unit 306, a periodic email information storage unit 307, a scanned data storage unit 308, a modification rule storage unit 312, and a new email storage unit 313.

Figure 4A:
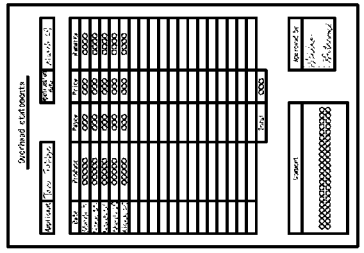
FIG. 4A and FIG. 4B show examples of sent emails.
Figure 4B:
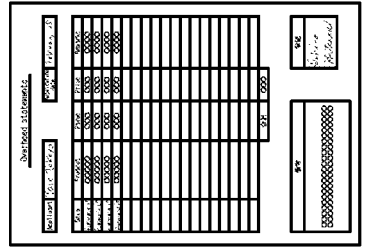

The sent email storage unit 301 stores therein emails sent by the image scanning device 100. FIG. 4A and FIG. 4B show examples of sent emails, which are stored in the sent email storage unit 301.

A sent email 401 shown in FIG. 4A has a subject "Overhead statements for February", a destination address "aaa@sample", a body "I am sending the overhead statements for February as an attached file.", and an attachment of image data.

Meanwhile, a sent email 402 shown in FIG. 4B has a subject "Overhead statements for March", a destination address "aaa@sample", a body "I am sending the overhead statements for March as an attached file.", and an attachment of image data.

The periodicity keyword storage unit 306 stores therein periodicity keywords suggesting periodicity. The periodicity keywords are used for judging whether a sent email is a periodic email that has substantially the same text in each of the subject and the body and is sent at periodic intervals. FIG. 5 shows an example of periodicity keywords stored in the periodicity keyword storage unit 306.

As shown in the figure, the periodicity keyword storage unit 306 stores therein a keyword 1 "January|February|March|April|May|June|July|August|September|October|November|December". This keyword 1 is a regular expression of a character string representing month name such as "January" and "February". In other words, the character string expressing month name such as "January" and "February" is a periodicity keyword.

Similarly, the periodicity keyword storage unit 306 stores therein a plurality of periodicity keywords (keywords 2, 3, 4, . . . ).

The periodic email information storage unit 307 stores therein periodic email information generated based on a sent email which is judged to be a periodic email. FIG. 6A and FIG. 6B show examples of periodic email information stored in the periodic email information storage unit 307.

Periodic email information 601 shown in FIG. 6A is periodic email information generated based on the sent email 401 shown in FIG. 4A. The periodic email information 601 has a subject "Overhead statements for February", a destination address "aaa@sample", and a body "I am sending the overhead statements for February as an attached file.", which are the same data as that of the sent email 401. The periodic email information 601 also has an image feature "overhead statements". This means that the character string "overhead statements" is extracted as an image feature of the file attached to the sent email 401 as a result of feature extraction from the attached file. The periodic email information 601 further has information indicating, as a modification part 1, a position of the 25th to the 32nd characters from the front in the character string constituting the subject, and information indicating, as a modification part 2, a position of the 42nd to the 49th characters from the front in the character string constituting the body. These information pieces indicate the respective positions of the word "February" in the subject and the body detected as the periodicity keyword, and indicate parts to be modified for new email generation based on the periodic email information 601. Note that a white space character in a character string is also counted as a character.

Meanwhile, periodic email information 602 shown in FIG. 6B is periodic email information generated based on the sent email 402 shown in FIG. 4B. The periodic email information 602 has a subject "Overhead statements for March", a destination address "aaa@sample", and a body "I am sending the overhead statements for March as an attached file.", which are the same data as that of the sent email 402. The periodic email information 602 also has an image feature "overhead statements". This means that the character string "overhead statements" is extracted as an image feature of the file attached to the sent email 402 as a result of feature extraction from the attached file. The periodic email information 602 further has information indicating, as a modification part 1, a position of the 25th to the 29th characters from the front in the character string constituting the subject, and information indicating, as a modification part 2, a position of the 42nd to the 46th characters from the front in the character string constituting the body. These information pieces indicate the respective positions of the word "March" in the subject and the body detected as the periodicity keyword, and indicate parts to be modified for new email generation based on the periodic email information 602.

The scanned data storage unit 308 stores therein scanned data obtained by the image scanner 120 scanning documents. Scanned data 701 shown in FIG. 7 is an example of scanned data stored in the scanned data storage unit 308, and is used as a file to be attached to a new email.

The modification rule storage unit 312 stores therein modification rule information 801 for new email generation based on periodic email information. The modification rule information 801 defines modification rules of modifying data set in the periodic email information. FIG. 8 shows an example of the modification rule information 801 stored in the modification rule storage unit 312.

As shown in the figure, the modification rule storage unit 312 stores therein, as the modification rule information 801, a plurality of rules each of which is composed of a set of a character string before modification, a condition, and a character string after modification. These rules are used for new email generation based on periodic email information. According to the rules, in the case where a character string indicated by a modification part of periodic email information matches a character string before modification and a condition is satisfied, the character string before modification is to be modified to a character string after modification. For example, a rule 4 is composed of a set of a character string before modification "January|February|March|April|May|June|July|August|September|October|November|December", a condition "current date from April 6 to May 5", and a character string after modification "April". Here, the character string before modification is a regular expression of a character string representing month name, similarly to the regularity keywords. Accordingly, the rule 4 indicates a rule that in the case where the current date is from April 6 to May 5, the character string representing month name such as "February" and "March" is to be modified to "April".

The new mail storage unit 313 stores therein new email information 901 composed of a subject, a destination address, and a body of a new email in draft version or in complete version before sending. FIG. 9 shows an example of the generated new email information 901. The new email information 901 shown in the figure has a subject "Overhead statements for April", a destination address "aaa@sample", and a body "I am sending the overhead statements for April as an attached file.".

The periodic email extraction unit 302 includes a feature extraction subunit 303, a keyword detection subunit 304, and a periodic email judgment subunit 305.

The feature extraction subunit 303 performs optical character recognition (OCR) on image data attached to each sent mail to obtain character strings included in the image data and information such as position, size, and color of the character strings. Further, the feature extraction subunit 303 detects, as a title of scanned data to be attached to a new email, one among the character strings obtained by the recognition. The feature extraction subunit 303 for example detects, as the title of the scanned data, a character string around the top center recognized as having a larger size than character strings in other portions on the image data. The feature extraction subunit 303 then extracts, as an image feature of the image data, the character string detected as the subject of the image data. The feature extraction subunit 303 for example extracts, as the image feature, the character string "overhead statement" from the file attached to the sent email 401.

The keyword detection subunit 304 detects a regularity keyword from a subject and/or a body of each sent email. Regularity keywords are stored in the periodicity keyword storage unit 306 as described above. The keyword detection subunit 304 for example detects the periodicity keyword "February" from the subject of the sent email 401.

Also, the keyword detection subunit 304 acquires a position of the detected periodicity keyword as a modification part. A modification part is a part to be modified when a new email is generated by copying at least one of a subject and a body of a sent email. The keyword detection subunit 304 for example acquires, as a modification part, the 25th to the 32nd characters from the front in the character string constituting the subject of the sent email 401. Note that the keyword detection subunit 304 is hereinafter referred to also as a modification part detection subunit.

The periodic email judgment subunit 305 judges whether each sent mail is a periodic email based on the image feature extracted by the feature extraction subunit 303 and the periodicity keyword detected by the keyword detection subunit 304. Specifically, the periodic email judgment subunit 305 judges whether one sent email is similar to any other sent email in terms of image feature of image data attached, and also judges whether the one sent email includes any periodicity keyword in a subject and/or a body thereof. To judge that the one sent email is similar to any other sent email in terms of image feature of image data attached, complete match between the two image features is not necessary. Instead, the periodic email judgment subunit 305 calculates the similarity degree between the two image features by a predefined algorithm, and judges that the two image features are similar to each other in the case where the similarity degree is no less than a predefined threshold or in the case where the similarity degree is greater than the predefined threshold. In the present embodiment, the image feature is represented by character strings. Thus, the periodic email judgment subunit 305 calculates (M−D)/M as the similarity degree between two character strings, where M represents the number of characters of one of the two character strings which has more characters than the other, and D represents a Levenshtein distance between two character strings. In the case where the similarity degree is greater than 0.9, the two image features are judged to be similar to each other. In the case where one sent email is similar to any other sent email in terms of image feature of image data attached and includes any periodicity keyword in its subject and/or body, the periodic email judgment subunit 305 judges that the one sent email is a periodic email. Meanwhile, in the case where the one sent email does not satisfy these two conditions, the periodic email judgment subunit 305 judges that the one sent email is not a periodic email.

With respect to the sent email, which is judged to be a periodic email, the periodic email extraction unit 302 generates periodic email information composed of the subject, the destination address, the body, the image feature extracted from the sent email, a modification part (position of the periodicity keyword) detected from the sent email. The periodic email extraction unit 302 then stores the generated periodic email information in the periodic email information storage unit 307.

The feature extraction unit 309 performs, on the scanned data 701 stored in the scanned data storage unit 308, the same processing as that performed by the feature extraction subunit 303. The feature extraction unit 309 for example extracts, as an image feature, a character string "overhead statement" from the scanned data 701.

The feature matching unit 310 matches the image feature extracted from the scanned data 701 against an image feature of any periodic email information stored in the periodic email information storage unit 307 to judge whether the image feature of the scanned data 701 is similar to the image feature of the periodic email information. The similarity judgment is the same as the above similarity judgment of image feature by the periodic email judgment subunit 305. The feature matching unit 310 outputs, to the email generation unit 311, information that identifies periodic email information including an image feature judged to be similar to the image feature of the scanned data 701 from among a plurality of periodic email information pieces. When judging that the image feature of the scanned data 701 is similar to a plurality of image features of a plurality of periodic email information pieces, the feature matching unit 310 for example outputs, to the email generation unit 311, information that identifies periodic email information corresponding to an email sent on the latest date and time from among the plurality of periodic email information pieces.

The email generation unit 311 acquires the periodic email information stored in the periodic email information storage unit 307, and copies a subject, a destination address, and a body which are set in the acquired periodic email information thereby to generate a new email. Further, the email generation unit 311 modifies a modification part of the copied subject and/or body according to the modification rule information 801 stored in the modification rule storage unit 312.

The display control unit 314 generates a confirmation screen 1001 for display on the display unit of the operation panel 110. The confirmation screen 1001 is a screen through which a user checks whether to send the new email generated by the email generation unit 311 with the subject, the destination address, and the body displayed thereon.

FIG. 10 shows an example of the confirmation screen 1001 displayed on the display unit of the operation panel 110. As shown in the figure, the confirmation screen 1001 includes a subject, a destination address, and a body of a new email generated by the email generation unit 311. Through the confirmation screen 1001 displayed, the user can confirm that the subject, the destination address, and the body of the new email are properly set, and can modify the subject, the destination address, and the body if they are not proper. Such modification can be made by pressing a button "Modify and send" of the confirmation screen 1001. Upon press of this button, the confirmation screen 1001 switches to a modification receiving screen (not shown), through which the user can make the modification and instruct to send the new email after modification. The series of processing is processing of displaying a modification part and processing of receiving modification to the modification part from the user.

The email sending unit 315 is connected to the sending mail server through the NIC 205 to send a new email stored in the new email storage unit 313 with the scanned data 701 attached. Also, the email sending unit 315 stores the sent new email in the sent email storage unit 301.

1.4 Operations of Image Scanning Device 100

The following describes the operations of the image scanning device 100, with reference to a flowchart in FIG. 11.

The main controller 200 receives a setting of a scanning job and an execution instruction of the scanning job from a user (Step S101).

The image scanner 120 scans a document placed on the document tray according to the received setting of the scanning job to obtain scanned data, and stores the scanned data in the scanned data storage unit 308 (Step S102).

The feature extraction unit 309 extracts an image feature of the scanned data stored in the scanned data storage unit 308 (Step S103).

The feature matching unit 310 acquires periodic email information from the periodic email information storage unit 307 (Step S104), and matches the image feature of the scanned data against an image feature of the periodic email information to judge whether the image feature of the scanned data is similar to the image feature of the periodic email information (Step S105).

When judging that the image feature of the scanned data is similar to the image feature of the periodic email information (Step S106: Yes), the email generation unit 311 generates a new email based on the periodic email information (Step S107).

The display control unit 314 generates a confirmation screen 1001 including a subject, a destination address, and a body of the new email generated by the email generation unit 311, and displays the confirmation screen 1001 on the display unit of the operation panel 110 (Step S108).

Upon receiving an email sending instruction from the user in response to the display on the confirmation screen 1001, the email sending unit 315 sends the new email generated by the email generation unit 311 with the scanned data attached (Step S109).

Meanwhile, when judging that the image feature of the scanned data is not similar to the image feature of the periodic email information (Step S106: No), the main controller 200 performs normal post-image-scanning processing, instead of new email generation based on the periodic email information (Step S110). Note that the normal post-image-scanning processing is processing performed by conventional image scanning devices and image forming devices, such as processing of storing scanned data in a predefined storage destination and processing of printing the scanned data. The details are omitted here.

The following describes the operations of the periodic email extraction unit 302, with reference to a flowchart in FIG. 12.

The periodic email extraction unit 302 acquires sent emails with image data attached from the sent email storage unit 301 (Step S201).

The feature extraction unit 303 extracts an image feature from the image data attached to each of the sent emails (Step S202).

The keyword detection subunit 304 detects a periodicity keyword included in at least one of a subject and a body of each of the sent mails (Step S203).

The periodic email judgment subunit 305 selects one of sent emails which have not been yet judged to be a periodic email or not (Step S204), and judges whether the selected sent email is a periodic email in Steps S205-S207 and S209.

The periodic email judgment subunit 305 matches the image feature of the image data attached to the sent email selected in Step S204 against the image features of the image data attached to the other sent emails to judge whether the image feature of the image data attached to the selected sent email is similar to the image feature of the image data attached to any of the other sent emails (Step S205).

The periodic email judgment subunit 305 judges whether the subject and/or the body of the sent email selected in Step S204 includes a periodicity keyword (Step S206).

When judging that the image feature of the image data attached to the sent email selected in Step S204 is similar to that of any of the other sent emails (Step S205: Yes) and judging that the subject and/or the body of the selected sent email includes a periodicity keyword (Step S206: Yes), the periodic email judgment subunit 305 judges that the selected sent email is a periodic email (Step S207).

Meanwhile, when judging that the image feature of the image data attached to the sent email selected in Step S204 is similar to none of the other sent emails (Step S205: No) or judging that the subject and/or the body of the selected sent email includes no periodicity keyword (Step S206: No), the periodic email judgment subunit 305 judges that the selected sent email is not a periodic email (Step S209).

The periodic email extraction unit 302 generates periodic email information based on the sent email, which is judged to be a periodic email, and stores the generated periodic email information in the periodic email information storage unit 307 (Step S208).

The periodic email extraction unit 302 judges whether the judgment as to whether a sent email is a periodic email is complete on all the sent emails. When judging that the judgment on all the sent emails is complete, the periodic email extraction unit 302 ends the processing. When judging that the judgment on all the sent emails is not yet complete, the periodic email extraction unit 302 returns to Step S204 to continue the processing (Step S210).

Figure 13:
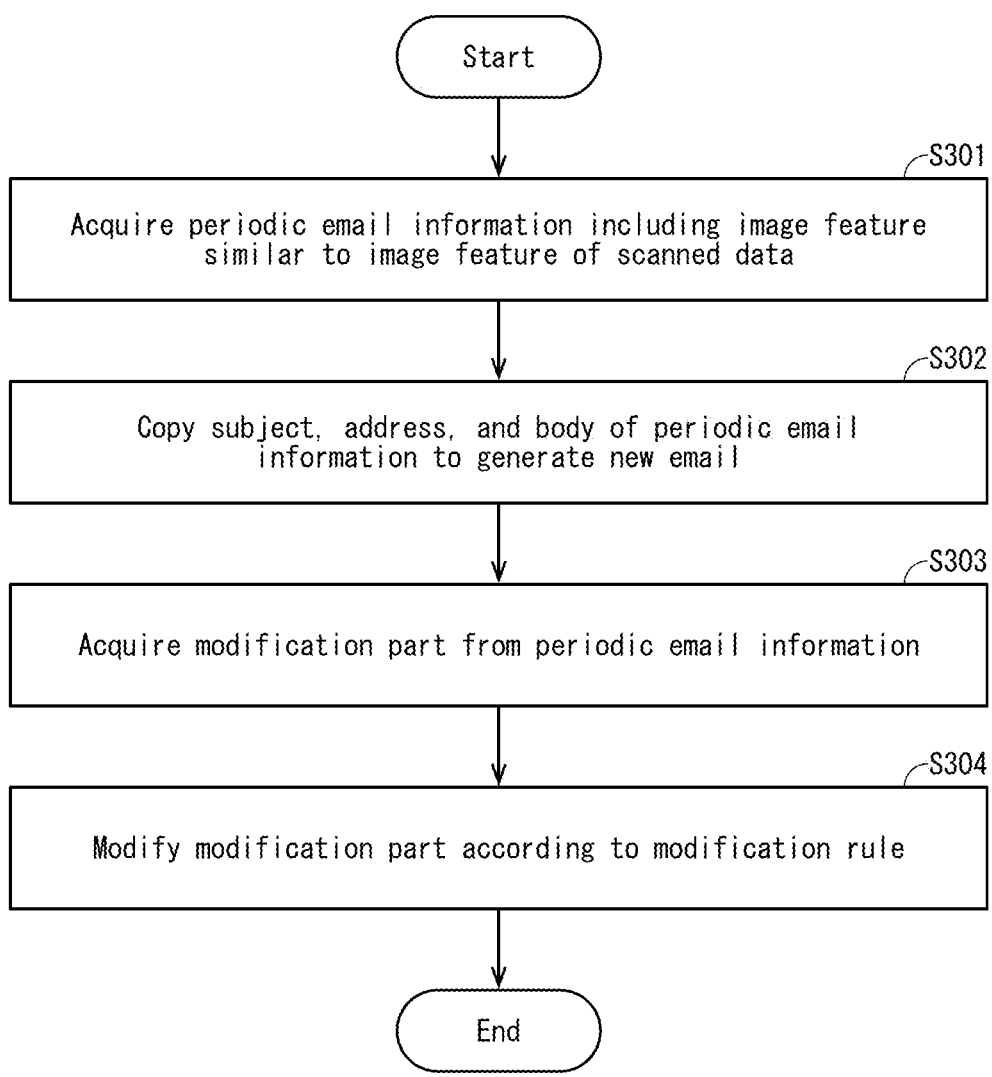
FIG. 13 is a flowchart of operations of an email generation unit 311.

The following describes the operations of the email generation unit 311, with reference to a flowchart in FIG. 13.

The email generation unit 311 acquires, from the periodic email information storage unit 307, periodic email information, notified from the feature matching unit 310, which includes an image feature similar to an image feature of scanned data (Step S301).

The email generation unit 311 copies a subject, a destination address, and a body of the acquired periodic email information thereby to generate a new email (Step S302).

The email generation unit 311 acquires a modification part of the subject and/or the body from the acquired periodic email information (Step S303).

The email generation unit 311 acquires the modification rule information 801 from the modification rule storage unit 312, modifies the modification part of the subject and/or the body according to the modification rule information 801, and stores the new email after modification (including the subject, the destination address, and the body) in the new mail storage unit 313 (Step S304).

The operations of the image scanning device 100 are as described above.

2. Supplement

Although the present disclosure has been described based on the above embodiment, the present disclosure is not of course limited to the above embodiment. The technical scope of the present disclosure of course includes the following modifications.

Figure 14:
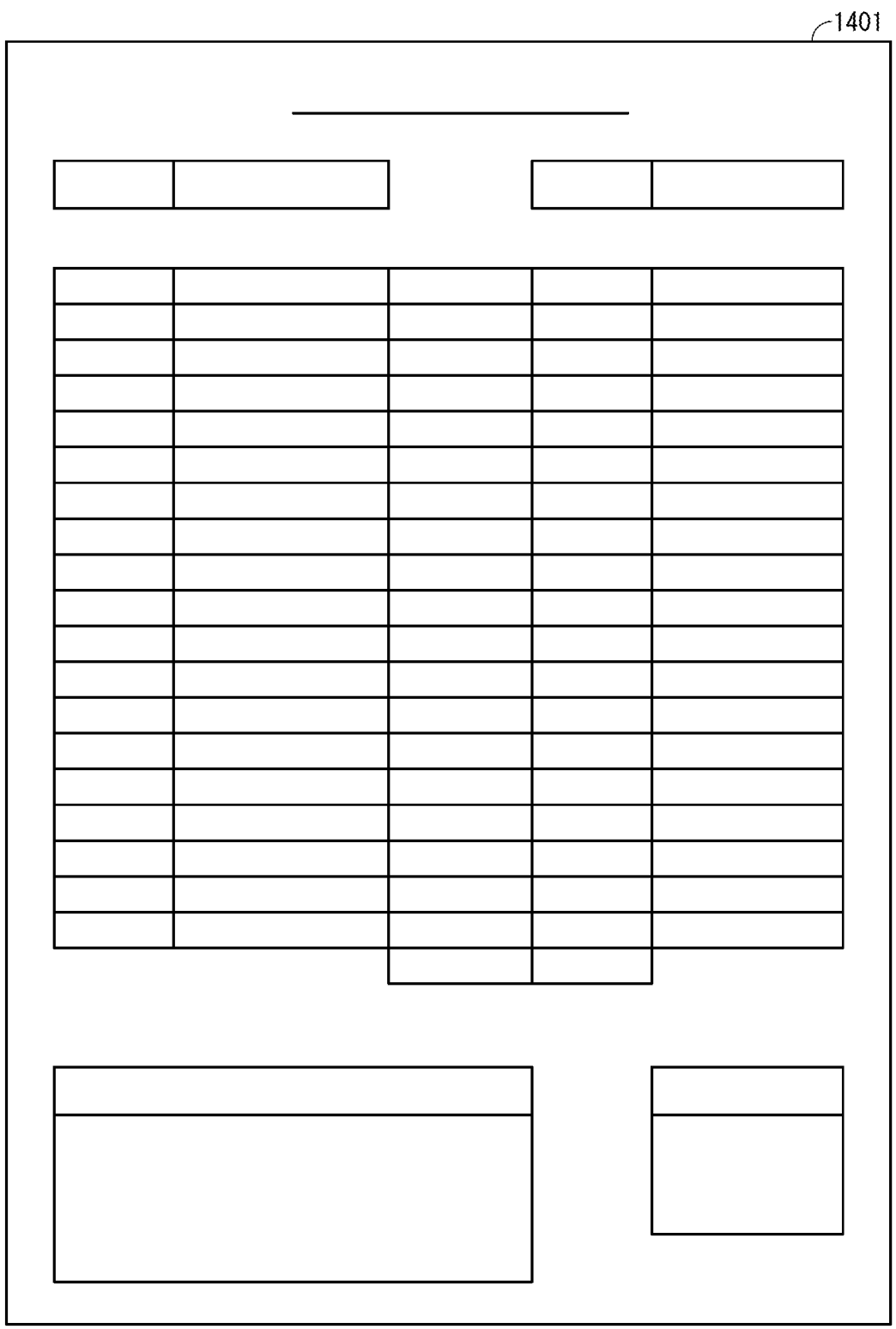
FIG. 14 shows structure of ruled lines extracted from scanned data as an example of an image feature.

(1) In the above embodiment, the feature extraction unit 303 and the feature extraction unit 309 extract image features by performing OCR on scanned data to detect character strings as image features. However, image features are not limited to character strings resulting from the OCR. For example, as shown in FIG. 14, the structure of ruled lines (a set of line segments, which are pairs of endpoint coordinates) may be extracted from image data as an image feature of the image data. Specifically, the structure of ruled lines is extracted by detecting the line segments having a predefined length or longer from the image data.

Alternatively, an image feature may be a feature value calculated by an algorithm such as speeded up robust features (SURF) and scale-invariant feature transform (SIFT).

(2) In the above embodiment, the keyword detection subunit 304 (modification part detection subunit) detects a periodicity keyword from a subject and/or a body of a sent email, and acquires a position of the detected periodicity keyword as a modification part for new email generation. However, modification parts are not limited to this. For example, in the case where one sent email is similar to other sent email in terms of image feature of image data attached thereto, the keyword detection subunit 304 may detect a difference between the one sent email and the other sent email in terms of subject and body, and acquire the difference as a modification part of the one sent email.

(3) In the above embodiment, in the case where one sent email is similar to any other sent email in terms of image feature of image data attached and includes any periodicity keyword in its subject and/or body, the periodic email judgment subunit 305 judges that the one sent email is a periodic email. Meanwhile, in the case where the one sent email does not satisfy these two conditions, the periodic email judgment subunit 305 judges that the one sent email is not a periodic email. However, the judgement as to whether a sent email is a periodic email is not limited to this.

For example, in the case where one sent email is similar to any other sent email in terms of image feature of image data attached and/or includes any periodicity keyword in its subject and/or body, the periodic email judgment subunit 305 may judge that the one sent email is a periodic email. Meanwhile, in the case where one sent email does not satisfy at least one of these two conditions, the periodic email judgment subunit 305 may judge that the one sent email is not a periodic email.

Alternatively, in the case where one sent email is similar to any other sent email in terms of image feature of image data attached and has the same destination address as the any other sent email, the periodic email judgment subunit 305 may judge that the one sent email is a periodic email. Meanwhile, in the case where the one sent email does not satisfy at least one of these two conditions, the periodic email judgment subunit 305 may judge that the one sent email is not a periodic email.

Further alternatively, the periodic email judgment subunit 305 may be an AI model which is generated by machine learning with use of a plurality of sent emails as training data so as to judge whether a sent email other than the sent emails used as the training data is a periodic email.

(4) In the above embodiment, the email generation unit 311 determines a method of modifying a modification part of periodic email information according to the modification rule information 801. However, a method of modifying a modification part of periodic email information is not limited to this.

For example, in the case where a character string before modification indicated by a modification part includes a certain number, the email generation unit 311 may use, as a character string after modification, a character string which includes a number obtained by incrementing the certain number. Specifically, in the case for example where a character string before modification is "the 1st", a character string "the 2nd" obtained by incrementing the number "1" and replacing the suffix "st" with an appropriate suffix "nd" may be used as a character string after modification.

Alternatively, in the case where a character string before modification expresses a predefined period, the email generation unit 311 may use, as a character string after modification, a character string expressing as a period following the predefined period. Specifically, in the case for example where a character string before modification is "the first half of the year", a character string "the second half of the year" expressing a period following the first half of the year may be used as a character string after modification.

Further alternatively, the email generation unit 311 may perform OCR on scanned data to detect a specific keyword from a character string resulting from the OCR, and use the specific keyword as a character string after modification. Specifically, in the case for example where a character string before modification is "March" and a character string obtained by OCR on scanned data includes a keyword "April", the keyword "April" may be used as a character string after modification.

Also, the email generation unit 311 may display a subject, a destination address, and/or a body before modification on the display unit of the operation panel 110 such that a modification part is emphasized, and may receive a user's modification to the modification part through the input unit of the operation panel 110.

(5) The image scanning device 100 may include a login management unit that manages login status of users. The sent email storage unit 301 may manage sent emails for each user. The periodic email extraction unit 302 may generate periodic email information based on an email sent by a user who has issued a scanning instruction.

Also, with respect to a user who has not yet logged in to the image scanning device 100 and has issued a scanning instruction, in the case where an image feature of scanned data is similar to any of image features of image data attached to emails sent by a specific user among emails sent by users stored in the sent email storage unit 301, the image scanning device 100 may prompt the user to log in to the image scanning device 100 and generate periodic email information for the user who has logged in.

(6) The above embodiment and modifications may be combined with one another.

3. Supplement 2

The present disclosure aims to provide an image scanning device capable of reducing users' burden in email sending with an attachment of scanned data.

The image scanning device relating to at least one embodiment of the present disclosure is an image scanning device comprising: a storage that stores therein an image feature of image data attached to a sent email; an image scanner that scans a document to obtain scanned data; and a hardware processor that: extracts an image feature from the scanned data; judges whether the image feature extracted from the scanned data is similar to the image feature of the image data attached to the sent email; and when judging affirmatively, generates a new email by using part of the sent email, and sends the new email with an attachment of the scanned data.

The image scanning device relating to at least one embodiment may further comprise a display, wherein before sending the new email, the hardware processor may display a confirmation screen on the display, the confirmation screen including a subject, a destination address, and a body of the new email.

According to at least one embodiment, the image feature of the scanned data may be a character string obtained by character recognition performed on the scanned data, and the image feature of the image data stored in the storage may be a character string obtained by character recognition performed on the image data.

According to at least one embodiment, the hardware processor may judge whether each of sent emails with an attachment of image data is a periodic email, the periodic email having substantially the same contents and being sent at periodic intervals, and the storage may store therein an image feature of image data attached to a sent email judged as a periodic email.

According to at least one embodiment, when one sent email satisfies at least one of a first condition and a second condition, the hardware processor may judge that the one sent email is a periodic email, where the first condition is that an image feature of image data attached to the one sent email is similar to an image feature of image data attached to any of other sent emails, and the second condition is that a keyword suggesting periodicity is included in at least one of a subject and a body of the one sent email.

According to at least one embodiment, the hardware processor may generate the new email by copying at least one of a subject, a destination address, and a body of the sent email.

According to at least one embodiment, the hardware processor may detect a modification part from at least one of a subject and a body of the sent email, the modification part being a part to be modified for generating the new email by using part of the sent email.

According to at least one embodiment, the hardware processor may detect, as the modification part, a keyword suggesting periodicity from at least one of the subject and the body of the sent email.

The image scanning device relating to at least one embodiment may further comprise a display, wherein the hardware processor may display the detected modification part on the display, and receives a modification to the modification part from a user.

According to at least one embodiment, the hardware processor may receive a user's login, and the sent email may be an email sent by the user who is logging in.

According to at least one embodiment, the hardware processor may receive a user's login, and when the image feature of the scanned data matches the image feature of the image data attached to the sent email, the hardware processor may prompt the user to log in.

The present disclosure exhibits an excellent effect of reducing users' burden in sending a new email with an attachment of scanned data by automatically setting a subject and a destination address of the new email by using part of a sent email with an attachment of image data having an image feature similar to an image feature of the scanned data.

Although one or more embodiments of the present invention have been described and illustrated in detail, the disclosed embodiments are made for the purposes of illustration and example only and not limitation. The scope of the present invention should be interpreted by the terms of the appended claims

What is claimed is:

1. An image scanning device comprising:
    a storage that stores therein an image feature of image data attached to a sent email;
    an image scanner that scans a document to obtain scanned data; and
    a hardware processor that:
        extracts an image feature from the scanned data;
        judges whether the image feature extracted from the scanned data is similar to the image feature of the image data attached to the sent email; and
        when judging affirmatively, generates a new email by using part of the sent email, and sends the new email with an attachment of the scanned data.

2. The image scanning device of claim 1, further comprising
    a display, wherein
    before sending the new email, the hardware processor displays a confirmation screen on the display, the confirmation screen including a subject, a destination address, and a body of the new email.

3. The image scanning device of claim 1, wherein
    the image feature of the scanned data is a character string obtained by character recognition performed on the scanned data, and
    the image feature of the image data stored in the storage is a character string obtained by character recognition performed on the image data.

4. The image scanning device of claim 1, wherein
    the hardware processor judges whether each of sent emails with an attachment of image data is a periodic email, the periodic email having substantially the same contents and being sent at periodic intervals, and
    the storage stores therein an image feature of image data attached to a sent email judged as a periodic email.

5. The image scanning device of claim 4, wherein
    when one sent email satisfies at least one of a first condition and a second condition, the hardware processor judges that the one sent email is a periodic email, where
    the first condition is that an image feature of image data attached to the one sent email is similar to an image feature of image data attached to any of other sent emails, and
    the second condition is that a keyword suggesting periodicity is included in at least one of a subject and a body of the one sent email.

6. The image scanning device of claim 1, wherein
    the hardware processor generates the new email by copying at least one of a subject, a destination address, and a body of the sent email.

7. The image scanning device of claim 1, wherein
    the hardware processor detects a modification part from at least one of a subject and a body of the sent email, the modification part being a part to be modified for generating the new email by using part of the sent email.

8. The image scanning device of claim 7, wherein
    the hardware processor detects, as the modification part, a keyword suggesting periodicity from at least one of the subject and the body of the sent email.

9. The image scanning device of claim 7, further comprising
    a display, wherein
    the hardware processor displays the detected modification part on the display, and receives a modification to the modification part from a user.

10. The image scanning device of claim 1, wherein
    the hardware processor receives a user's login, and
    the sent email is an email sent by the user who is logging in.

11. The image scanning device of claim 1, wherein
    the hardware processor receives a user's login, and
    when the image feature of the scanned data matches the image feature of the image data attached to the sent email, the hardware processor prompts the user to log in.

* * * * *